(12) United States Patent
Chang

(10) Patent No.: US 11,764,816 B2
(45) Date of Patent: Sep. 19, 2023

(54) METHOD AND CIRCUIT FOR CONTROLLING CHANNEL MISMATCH COMPENSATION

(71) Applicant: REALTEK SEMICONDUCTOR CORPORATION, Hsinchu (TW)

(72) Inventor: Yuan-Shuo Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/877,051

(22) Filed: Jul. 29, 2022

(65) Prior Publication Data

US 2023/0040859 A1 Feb. 9, 2023

(30) Foreign Application Priority Data

Aug. 5, 2021 (TW) ................................. 110128978

(51) Int. Cl.
*H04B 1/12* (2006.01)
*H04B 1/405* (2015.01)

(52) U.S. Cl.
CPC ............. *H04B 1/123* (2013.01); *H04B 1/405* (2013.01)

(58) Field of Classification Search
CPC ................................. H04B 1/123; H04B 1/405
See application file for complete search history.

(56) References Cited

U.S. PATENT DOCUMENTS

| | | | | |
|---|---|---|---|---|
| 8,467,755 B2* | 6/2013 | Olson | ..................... | H03D 7/18 |
| | | | | 455/67.14 |
| 2009/0310711 A1* | 12/2009 | Chiu | ................... | H04L 27/3863 |
| | | | | 375/322 |
| 2020/0007378 A1* | 1/2020 | Vergel | .................. | H04L 27/364 |
| 2020/0153675 A1* | 5/2020 | Ramakrishnan | .... | H04L 27/0014 |
| 2020/0322067 A1* | 10/2020 | Gunturi | .................. | H04L 27/34 |

OTHER PUBLICATIONS

Guanbin Xing, Manyuan Shen, and Hui Liu "Frequency offset and IQ imbalance compensation for direct-conversion receivers," IEEE Transactions on Wireless Communications, vol. 4, No. 2, Mar. 2005.

* cited by examiner

*Primary Examiner* — Dac V Ha
(74) *Attorney, Agent, or Firm* — WPAT, P.C

(57) ABSTRACT

A method and circuit for controlling the compensation for channel mismatches are used in an electronic device which includes a signal transmission circuit or a signal receiving circuit that have two channels. The electronic device further includes a channel mismatch compensation circuit. The method includes: (A) determining a frequency of a test signal; (B) causing the test signal to pass through the signal transmission circuit or the signal receiving circuit, and measuring an image signal; (C) adjusting a compensation parameter of the channel mismatch compensation circuit to change an amplitude of the image signal; (D) determining, according to the amplitude of the image signal, a target compensation parameter of the channel mismatch compensation circuit, the target compensation parameter corresponding to the frequency of the test signal; (E) repeating steps (A) to (D) to obtain multiple target compensation parameters; and (F) determining a compensation mechanism based on the target compensation parameters.

16 Claims, 10 Drawing Sheets

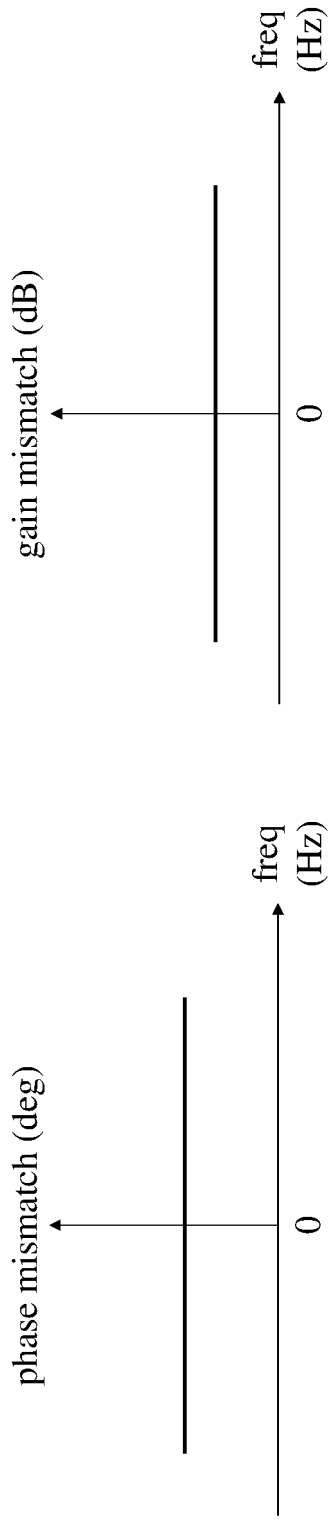

METHOD AND CIRCUIT FOR CONTROLLING CHANNEL MISMATCH COMPENSATION

BACKGROUND OF THE INVENTION

1. Field of the Invention

The present invention generally relates to a radio frequency (RF) transceiver circuit, and, more particularly, to the control of channel mismatch compensation of the RF transceiver circuit.

2. Description of Related Art

FIG. 1A is a functional block diagram of a conventional direct conversion transmitter. The direct conversion transmitter 100 includes a power amplifier (PA) 110, an adder circuit 115, a phase shifter 120, a local oscillator (LO) 125, an I-path 130, and a Q-path 140. The I-path 130 includes a mixer 132, a low-pass filter (LPF) 134, and a digital-to-analog converter (DAC) 136. The Q-path 140 includes a mixer 142, an LPF 144, and a DAC 146. The I-path signal S_I and the Q-path signal S_Q generated by the baseband circuit (not shown) pass through the I-path 130 and the Q-path 140, respectively. Then, the combined signal (combined by the adder circuit 115) is amplified by the PA 110 before being transmitted via the antenna.

FIG. 1B is a functional block diagram of a conventional direct conversion receiver. The direct conversion receiver 150 includes a low noise amplifier (LNA) 160, a phase shifter 170, an LO 175, an I-path 180, and a Q-path 190. The I-path 180 includes a mixer 182, an LPF 184, and an analog-to-digital converter (ADC) 186. The Q-path 190 includes a mixer 192, an LPF 194, and an ADC 196. The signal received via the antenna and amplified by the LNA 160 is divided into an I-path signal S_I (which passes through the I-path 180) and a Q-path signal S_Q (which passes through the Q-path 190) before being processed by the baseband circuit that follows (not shown).

The operating principles of the direct conversion transmitter 100 and the direct conversion receiver 150 are well known to people having ordinary skill in the art and thus omitted for brevity.

The direct conversion transmitter 100 and/or the direct conversion receiver 150 may have the problem of I/Q channel mismatch (or I/Q channel imbalance). The causes of the I/Q channel mismatch may include: (1) the phase offset between the I-path signal S_I and the Q-path signal S_Q being not 90 degrees, which results in a frequency-independent phase mismatch (as shown in FIG. 2A); (2) the production of the frequency-independent gain mismatch (as shown in FIG. 2B) by the components on the I-paths (130 and 180) and the components on the Q-paths (140 and 190); (3) any slight time difference between the I-path signal S_I and the Q-path signal S_Q during transmission, leading to a frequency-dependent phase mismatch (as shown in FIG. 3); and/or (4) the frequency response of the filters on the I-path being different from that of the filters on the Q-path (i.e., the LPF 134 and the LPF 144 being different in frequency response, and the LPF 184 and the LPF 194 being different in frequency response), giving rise to both a frequency-dependent phase mismatch (as shown in FIG. 4A) and a frequency-dependent gain mismatch (as shown in FIG. 4B).

The mismatch resulting from causes (1) and/or (2) can be compensated by a gain and/or phase compensation circuit; the mismatch resulting from cause (3) can be compensated by a time skew compensation circuit; the mismatch resulting from cause (4) can be compensated by a filter mismatch compensation circuit.

The compensation circuits corresponding to the above four causes are in the following order in terms of complexity: (4)>(3)>(2) and (1); in other words, the power consumption of the filter mismatch compensation circuit>that of the time skew compensation circuit>that of the gain and/or phase compensation circuit. Therefore, the power consumption of the electronic device is huge if the filter mismatch compensation circuit, the time skew compensation circuit, and the gain and/or phase compensation circuit are always turned on in an attempt to address all the mismatches. However, causes (4) and (3) are usually not the main cause of the I/Q channel mismatch (e.g., contributing to 5% and 15%, respectively). Therefore, a compensation mechanism that reduces the power consumption of the electronic devices is needed.

SUMMARY OF THE INVENTION

In view of the issues of the prior art, an object of the present invention is to provide a method and a circuit for controlling channel mismatch compensation, so as to make an improvement to the prior art.

According to one aspect of the present invention, a method of controlling the channel mismatch compensation is provided. The method is used in an electronic device that includes a signal transmission circuit or a signal receiving circuit. The signal transmission circuit or the signal receiving circuit includes a first channel and a second channel The electronic device further includes a channel mismatch compensation circuit. The method includes the following steps: (A) determining a frequency of a test signal; (B) causing the test signal to pass through the signal transmission circuit or the signal receiving circuit, and measuring an image signal; (C) adjusting a compensation parameter of the channel mismatch compensation circuit to change an amplitude of the image signal; (D) determining, according to the amplitude of the image signal, a target compensation parameter of the channel mismatch compensation circuit, the target compensation parameter corresponding to the frequency of the test signal; (E) repeating steps (A) to (D) to obtain a plurality of target compensation parameters; and (F) determining a compensation mechanism of the channel mismatch compensation circuit based on the target compensation parameters.

According to another aspect of the present invention, a circuit for controlling the channel mismatch compensation is provided. The circuit is used in an electronic device that includes a signal transmission circuit or a signal receiving circuit. The signal transmission circuit or the signal receiving circuit includes a first channel and a second channel The electronic device further includes a channel mismatch compensation circuit. The circuit performs the following steps to determine a compensation mechanism of the channel mismatch compensation circuit: (A) determining a frequency of a test signal; (B) causing the test signal to pass through the signal transmission circuit or the signal receiving circuit, and measuring an image signal; (C) adjusting a compensation parameter of the channel mismatch compensation circuit to change an amplitude of the image signal; (D) determining, according to the amplitude of the image signal, a target compensation parameter of the channel mismatch compensation circuit, the target compensation parameter corresponding to the frequency of the test signal; (E) repeating steps (A) to (D) to obtain a plurality of target compensation parameters; and (F) determining the compensation mechanism of the channel mismatch compensation circuit based on the target compensation parameters.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIGS. 2A-2B, FIG. 3, and FIGS. 4A-4B illustrate gain mismatch or phase mismatch versus frequency.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a method and circuit for controlling the channel mismatch compensation. On account of that some or all elements of the circuit for controlling the channel mismatch compensation could be known, the detail of such elements is omitted provided that such detail has little to do with the features of this disclosure, and that this omission nowhere dissatisfies the specification and enablement requirements. Some or all of the processes of the method of controlling the channel mismatch compensation may be implemented by software and/or firmware, and can be performed by the circuit for controlling the channel mismatch compensation or its equivalent. A person having ordinary skill in the art can choose components or steps equivalent to those described in this specification to carry out the present invention, which means that the scope of this invention is not limited to the embodiments in the specification.

Figure 5:
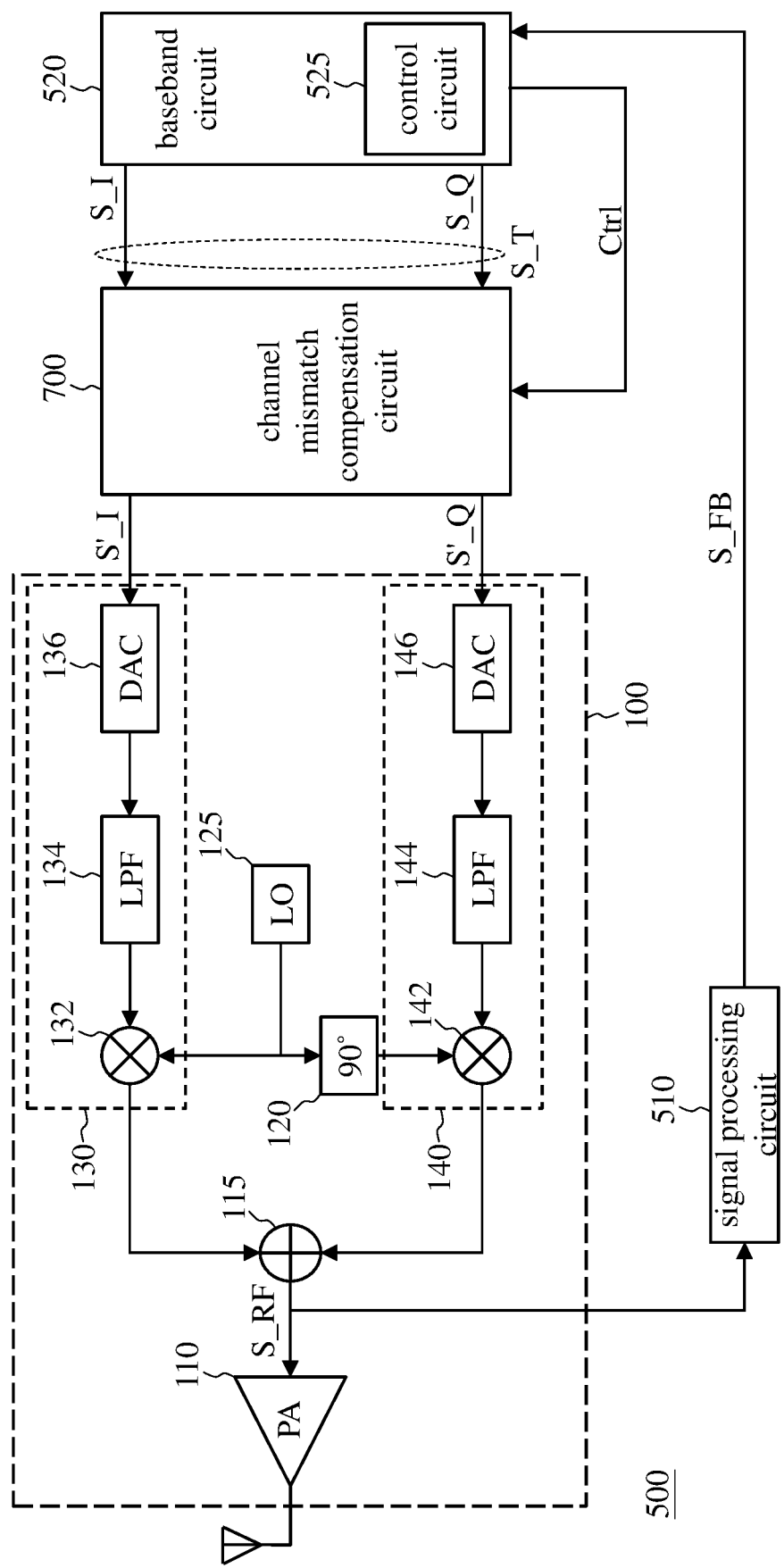
FIG. 5 illustrates a functional block diagram of a signal transmitting end of an electronic device according to an embodiment of the present invention.

FIG. 5 is a functional block diagram of a signal transmitting end of an electronic device according to an embodiment of the present invention. The signal transmitting end 500 includes a signal transmission circuit (i.e., the direct conversion transmitter 100), a signal processing circuit 510, a baseband circuit 520, and a channel mismatch compensation circuit 700. The baseband circuit 520 includes a control circuit 525. One end of the signal processing circuit 510 is coupled between the PA 110 and the adder circuit 115, and the other end of the signal processing circuit 510 is coupled to the baseband circuit 520 (more specifically, to the control circuit 525). The signal processing circuit 510 processes the RF signal S_RF and generates the feedback signal S_FB. When there is/are mismatch(es) between the I-path 130 and the Q-path 140 (i.e., when there is at least one of the four I/Q channel mismatches discussed above can be found in the direct conversion transmitter 100) and the mismatch(es) is/are not properly compensated for, the feedback signal S_FB contains unwanted image signal(s). The control circuit 525 controls, through the control signal Ctrl, the channel mismatch compensation circuit 700 according to the amplitude (i.e., energy) of the image signal(s).

The measurement of amplitude or energy of a signal (e.g., the image signal) is well known to people having ordinary skill in the art, and the details are thus omitted for brevity. In some embodiments, the signal processing circuit 510 includes a mixer, an LPF, an ADC, and an amplifier. For the operational details of the signal processing circuit 510, refer to the U.S. Pat. No. 8,879,677.

Figure 6:
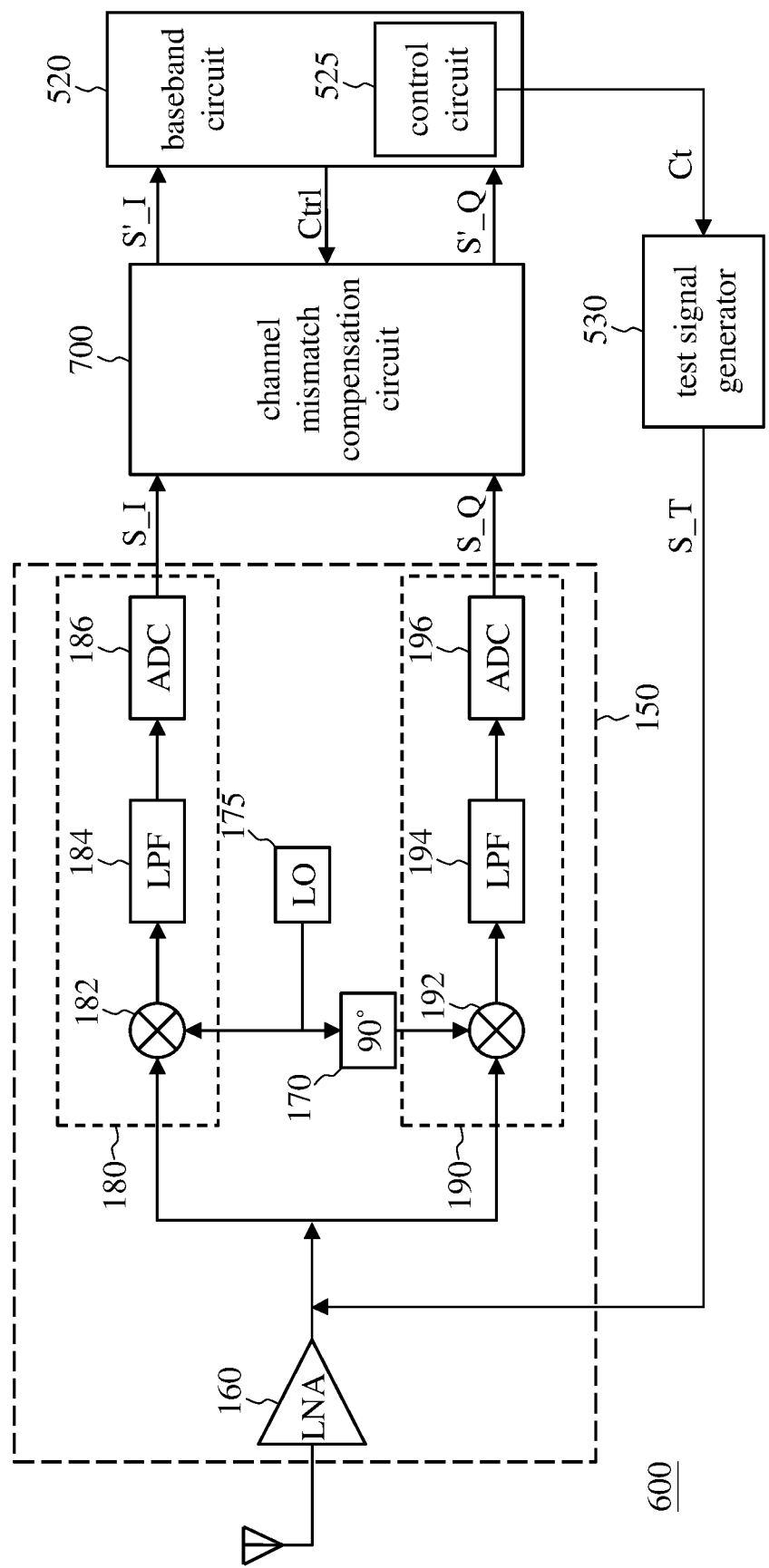
FIG. 6 illustrates a functional block diagram of a signal receiving end of an electronic device according to an embodiment of the present invention.

FIG. 6 is a functional block diagram of the signal receiving end of the electronic device according to an embodiment of the present invention. The signal receiving end 600 includes a signal receiving circuit (i.e., the direct conversion receiver 150), a baseband circuit 520, and the channel mismatch compensation circuit 700. When the I-path 180 and the Q-path 190 do not match (i.e., at least one of the four I/Q channel mismatches discussed above can be found in the direct conversion receiver 150), the I-path signal S_I and the Q-path signal S_Q contain unwanted image signal(s). Even though the I-path signal S_I and the Q-path signal S_Q are compensated by the channel mismatch compensation circuit 700, the I-path compensated signal S'_I and the Q-path compensated signal S'_Q may still contain image signal(s) if the compensation parameters of the channel mismatch compensation circuit 700 are not ideal values. The control circuit 525 controls, through the control signal Ctrl, the channel mismatch compensation circuit 700 according to the amplitude (i.e., energy) of the image signal(s).

Figure 7:
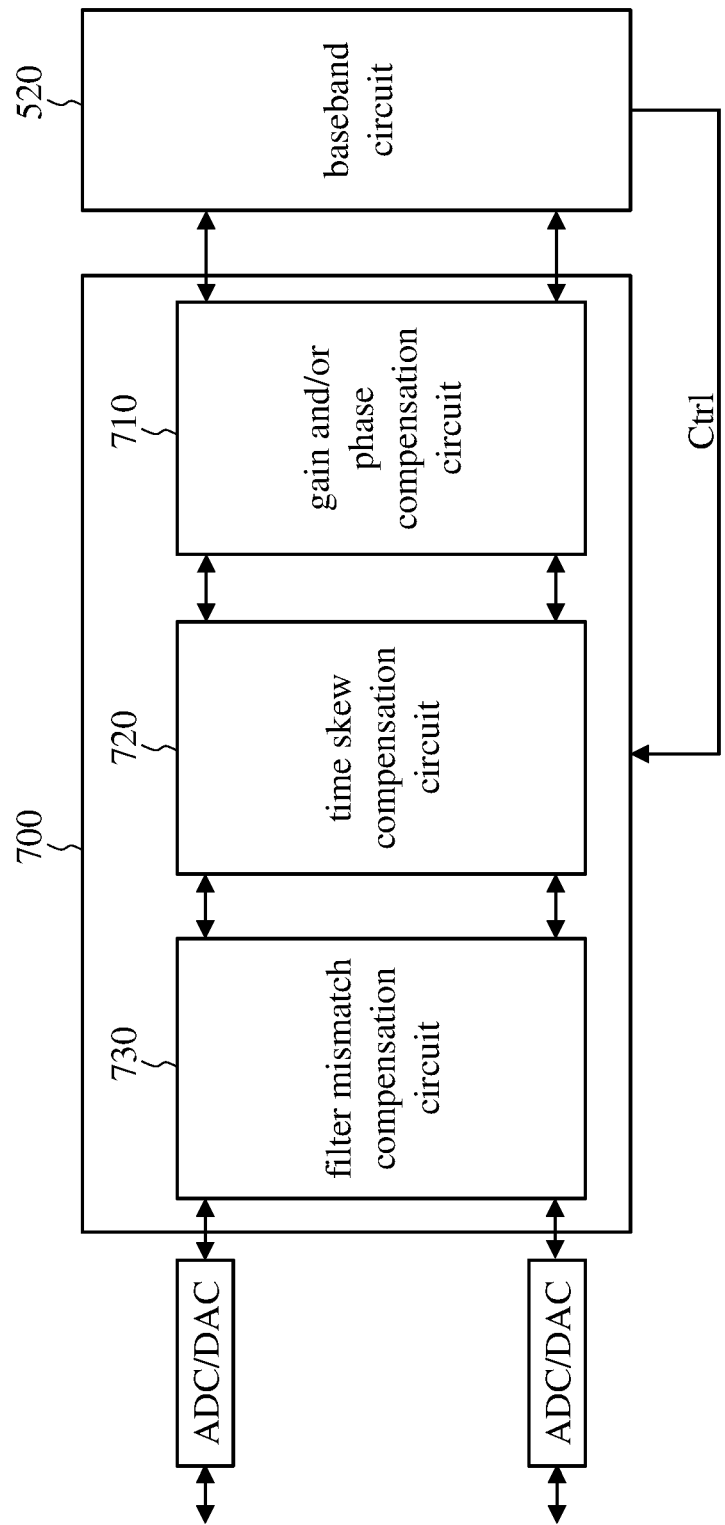
FIG. 7 illustrates a functional block diagram of a channel mismatch compensation circuit according to an embodiment of the present invention.

FIG. 7 is a functional block diagram of the channel mismatch compensation circuit 700 according to an embodiment of the present invention. The channel mismatch compensation circuit 700 includes a gain and/or phase compensation circuit 710, a time skew compensation circuit 720, and a filter mismatch compensation circuit 730. The gain and/or phase compensation circuit 710 is for the compensation of the first and/or second mismatch(es) (i.e., cause (1) and/or cause (2)) of the four I/Q channel mismatches discussed above, the time skew compensation circuit 720 is for the compensation of the third mismatch (i.e., cause (3)) of the four I/Q channel mismatches discussed above, and the filter mismatch compensation circuit 730 is for the compensation of the fourth mismatch (i.e., cause (4)) of the four I/Q channel mismatches discussed above. There are various embodiments of the gain and/or phase compensation circuit 710, the time skew compensation circuit 720, and the filter mismatch compensation circuit 730, and their operating principles are well known to people having ordinary skill in the art; thus, the details are omitted for brevity.

Figure 8:
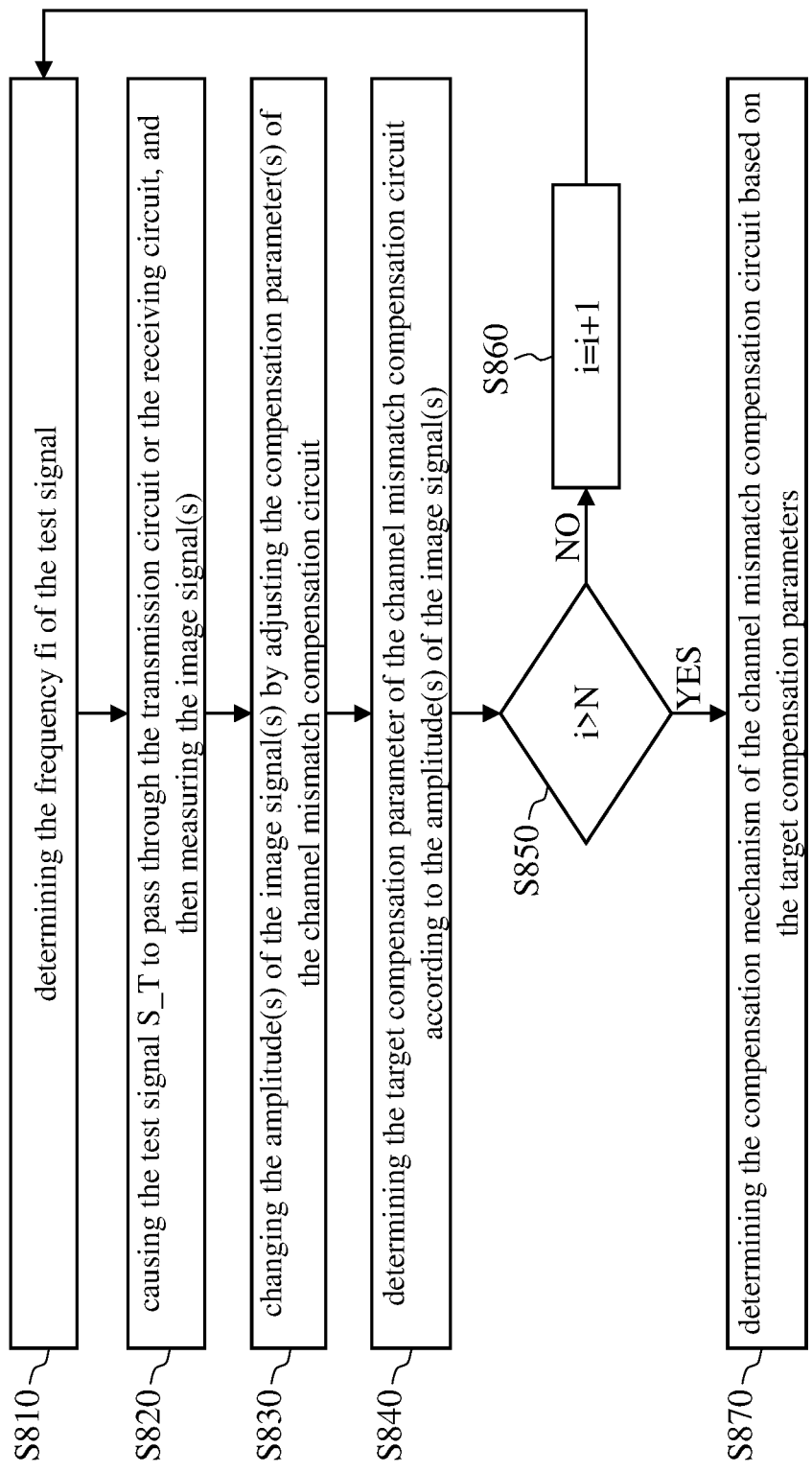
FIG. 8 illustrates a flowchart of a method of controlling the compensation for the I/Q channel mismatch according to an embodiment of the present invention.

FIG. 8 is a flowchart of the method of controlling the compensation for the I/Q channel mismatch according to an embodiment of the present invention. The method, executed by the control circuit 525, includes the following steps.

Step S810: The control circuit 525 determines the frequency fi of the test signal S_T. The test signal S_T is a single tone signal, where i is the numbering index (i being an integer), namely, f1 being the first frequency, f2 being the second frequency, etc. For the signal transmitting end 500, the test signal S_T is a baseband signal composed of the I-path signal S_I and the Q-path signal S_Q. For the signal receiving end 600, the test signal S_T is an RF signal that the test signal generator 530 generates. The generation of the test signal S_T is controlled by the control circuit 525 through the control signal Ct.

Step S820: Causing the test signal S_T to pass through the direct conversion transmitter 100 or the direct conversion receiver 150, and then measuring the image signal(s). As discussed above, when the compensation parameters of the channel mismatch compensation circuit 700 are not ideal value (i.e., the compensation result of the channel mismatch compensation circuit 700 is not ideal), the feedback signal S_FB of FIG. 5 as well as the I-path compensated signal S'_I and the Q-path compensated signal S'_Q of FIG. 6 contain the image signal(s).

Step S830: The control circuit 525 changes the amplitude (s) of the image signal(s) by adjusting the compensation parameter(s) of the channel mismatch compensation circuit 700. More specifically, in the flowchart of FIG. 8, the control circuit 525 disables (which, in some embodiments, may be equivalent to inactivating) the time skew compensation circuit 720 and the filter mismatch compensation circuit 730 and then adjusts the compensation parameters of the gain and/or phase compensation circuit 710 (including the phase compensation parameter and the gain compensation parameter) in step S830. Different compensation parameters correspond to different image signal amplitudes. The amplitude of the image signal becomes smaller when the compensation parameters are more ideal (i.e., the channel mismatch compensation circuit 700 has a better compensation effect). In this step, the control circuit 525 sets or adjusts the gain and/or phase compensation circuit 710 according to various compensation parameters or various compensation parameter combinations and records the correspondence between the amplitude of the image signal and the compensation parameters or compensation parameter combinations.

Step S840: The control circuit 525 determines the target compensation parameter of the channel mismatch compensation circuit 700 according to the amplitude(s) of the image signal(s), the target compensation parameter corresponding to the single tone frequency fi. In some embodiments, the control circuit 525 obtains the amplitudes of multiple image signals in step S830, and each amplitude corresponds to a set of compensation parameters (including the phase compensation parameter and the gain compensation parameter). In step S840, the control circuit 525 selects a set of compensation parameters corresponding to the smallest amplitude as the target compensation parameter combination (including the phase compensation parameter P(i) and the gain compensation parameter G(i)) for the single tone frequency fi.

Steps S850 and S860: The control circuit 525 determines whether the numbering index i is greater than the target value N (N being an integer). If not, the iteration (the repetitions of steps S810 to S860, with the numbering index i being updated in step S860) is performed. In this way, if the initial value of the numbering index i is one, the control circuit 525 will obtain N sets of target compensation parameters ((P(1), G(1)), (P(2), G(2)), (P(3), G(3)), . . . , (P(N), G(N))) corresponding to N single tone frequencies (f1, f2, f3, . . . , fN) after the iteration is completed.

Step S870: The control circuit 525 determines the compensation mechanism of the channel mismatch compensation circuit 700 based on the target compensation parameters, that is, determines whether to enable (which, in some embodiments, may be equivalent to activating) the time skew compensation circuit 720 and/or the filter mismatch compensation circuit 730.

Figure 9:
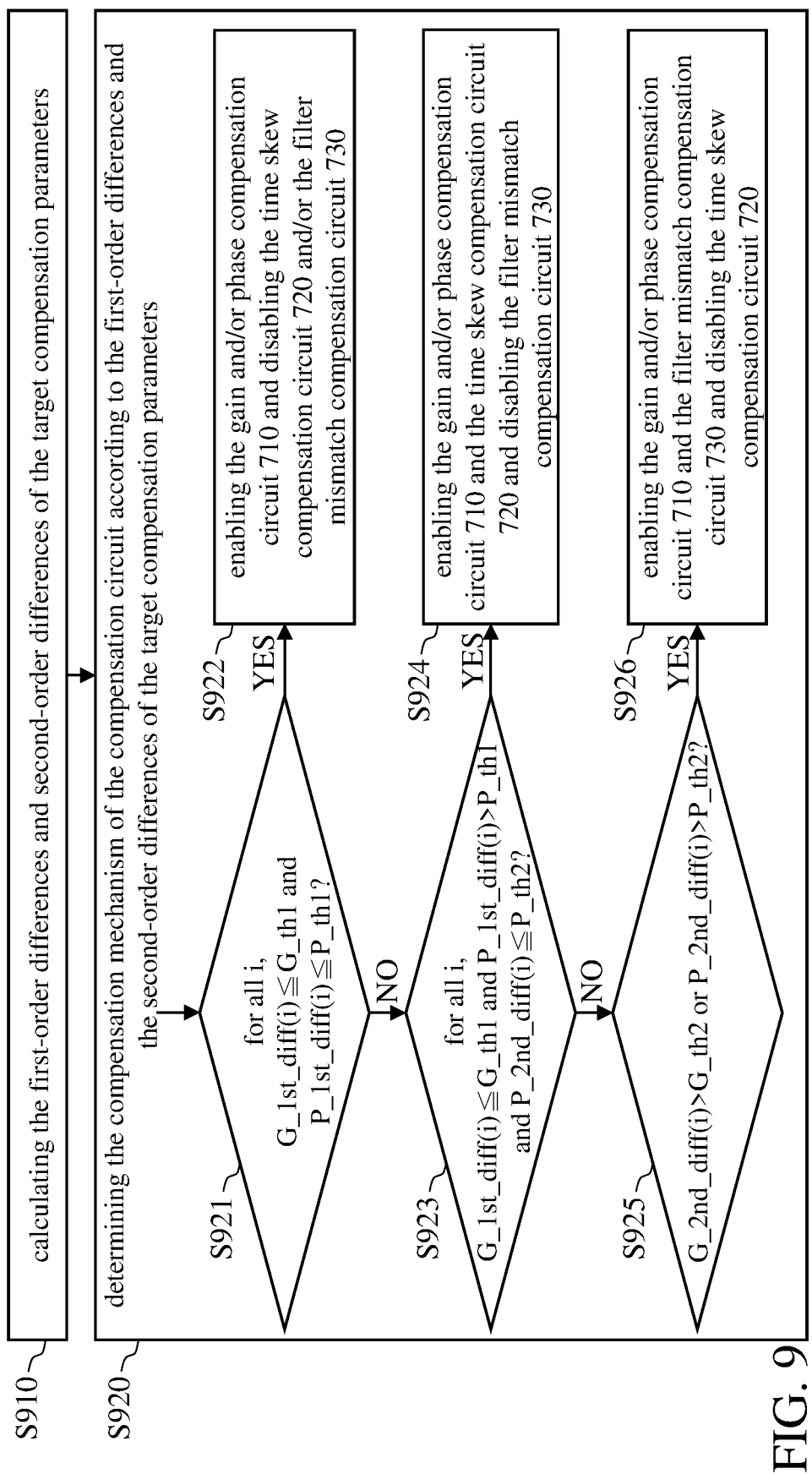
FIG. 9 illustrates an embodiment of the sub-steps of step 5870.

FIG. 9 shows an embodiment of the sub-steps of step S870, including the following steps.

Step S910: The control circuit 525 calculates the first-order differences and second-order differences of the target compensation parameters (including the phase compensation parameters P(1), P(2), P(3), . . . , P(N−1) and the gain compensation parameters G(1), G (2), G(3), . . . , G(N−1)). The first-order differences of the phase compensation parameters (hereinafter referred to as the first-order phase differences) P_1st_diff(i)=P(i+1)−P(i) (i=1, 2, . . . , N−1), the first-order differences of the gain compensation parameters (hereinafter referred to as the first-order gain differences) G_1st_diff(i)=G(i+1)−G(i) (i=1, 2, . . . , N−1), the second-order differences of the phase compensation parameters (hereinafter referred to as second-order phase differences) P_2nd_diff(i)=P_1st_diff(i+1)−P_1st_diff(i) (i=1, 2, . . . , N−2), and the second-order differences of the gain compensation parameters (hereinafter referred to as second-order gain differences) G_2nd_diff(i)=G_1st_diff(i+1)−G_1st_diff(i) (i=1, 2, . . . , N−2).

Step S920: The control circuit 525 determines the compensation mechanism of the compensation circuit according to the first-order differences and the second-order differences of the target compensation parameters. More specifically, the control circuit 525 determines whether to enable the gain and/or phase compensation circuit 710, the time skew compensation circuit 720, and/or the filter mismatch compensation circuit 730 (steps S922, S924, S926) according to the following conditions (steps S921, S923, S925).

Step S921: If, for all numbering indexes i, the first-order gain differences G_1st_diff(i) are less than or equal to the threshold G_th1 and the first-order phase differences P_1st_diff(i) are less than or equal to the threshold P_th1, the control circuit 525 performs step S922; otherwise, the control circuit 525 performs step S923.

Step S922: The control circuit 525 enables the gain and/or phase compensation circuit 710 and disables the time skew compensation circuit 720 and/or the filter mismatch compensation circuit 730. Note that disabling one of the time skew compensation circuit 720 and the filter mismatch compensation circuit 730 can achieve the purpose of saving power, and more power can be saved when both of them are disabled.

Step S923: If, for all numbering indexes i, the first-order gain differences G_1st_diff(i) are less than or equal to the threshold G_th1, the first-order phase differences P_1st_diff (i) are greater than the threshold P_th1, and the second-order phase differences P_2nd_diff(i) are less than or equal to the threshold P_th2, the control circuit 525 performs step S924; otherwise, the control circuit 525 performs step S925.

Step S924: The control circuit 525 enables the gain and/or phase compensation circuit 710 and the time skew compensation circuit 720 and disables the filter mismatch compensation circuit 730 to save power.

Step S925: If the second-order gain differences G_2nd_diff(i) are greater than the threshold G_th2 or the second-order phase differences P_2nd_diff(i) are greater than the threshold P_th2, the control circuit 525 performs step S926.

Step S926: The control circuit 525 enables the gain and/or phase compensation circuit 710 and the filter mismatch compensation circuit 730 and disables the time skew compensation circuit 720 to save power.

When the conditions of step S921 are met, the relationship between phase mismatch and frequency is similar to that of FIG. 2A, and the relationship between gain mismatch and frequency is similar to that of FIG. 2B. Therefore, in this situation, enabling just the gain and/or phase compensation circuit 710 is sufficient to achieve a considerable compensation effect, while the time skew compensation circuit 720 and the filter mismatch compensation circuit 730 are disabled to save power.

Figure 1A:
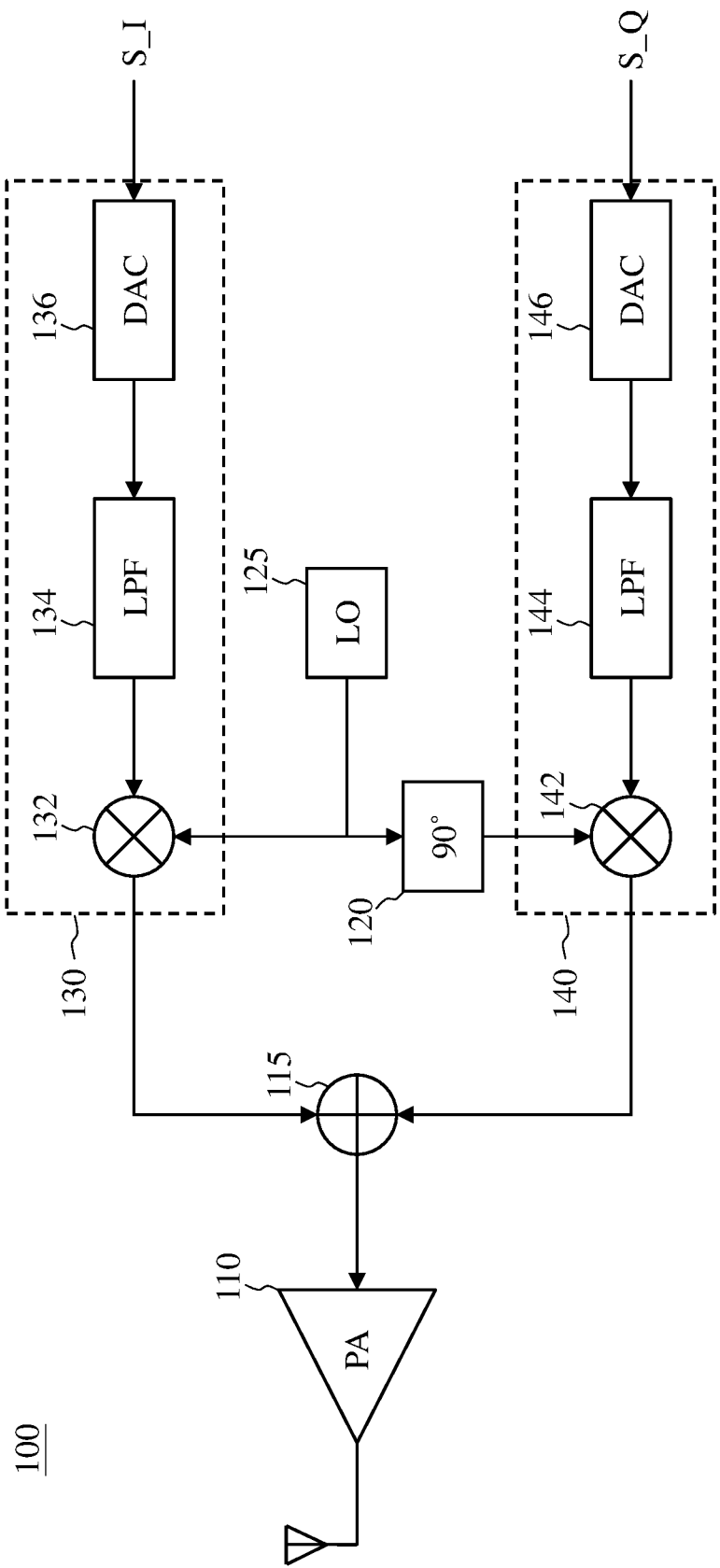
FIG. 1A illustrates a functional block diagram of a conventional direct conversion transmitter.
Figure 1B:
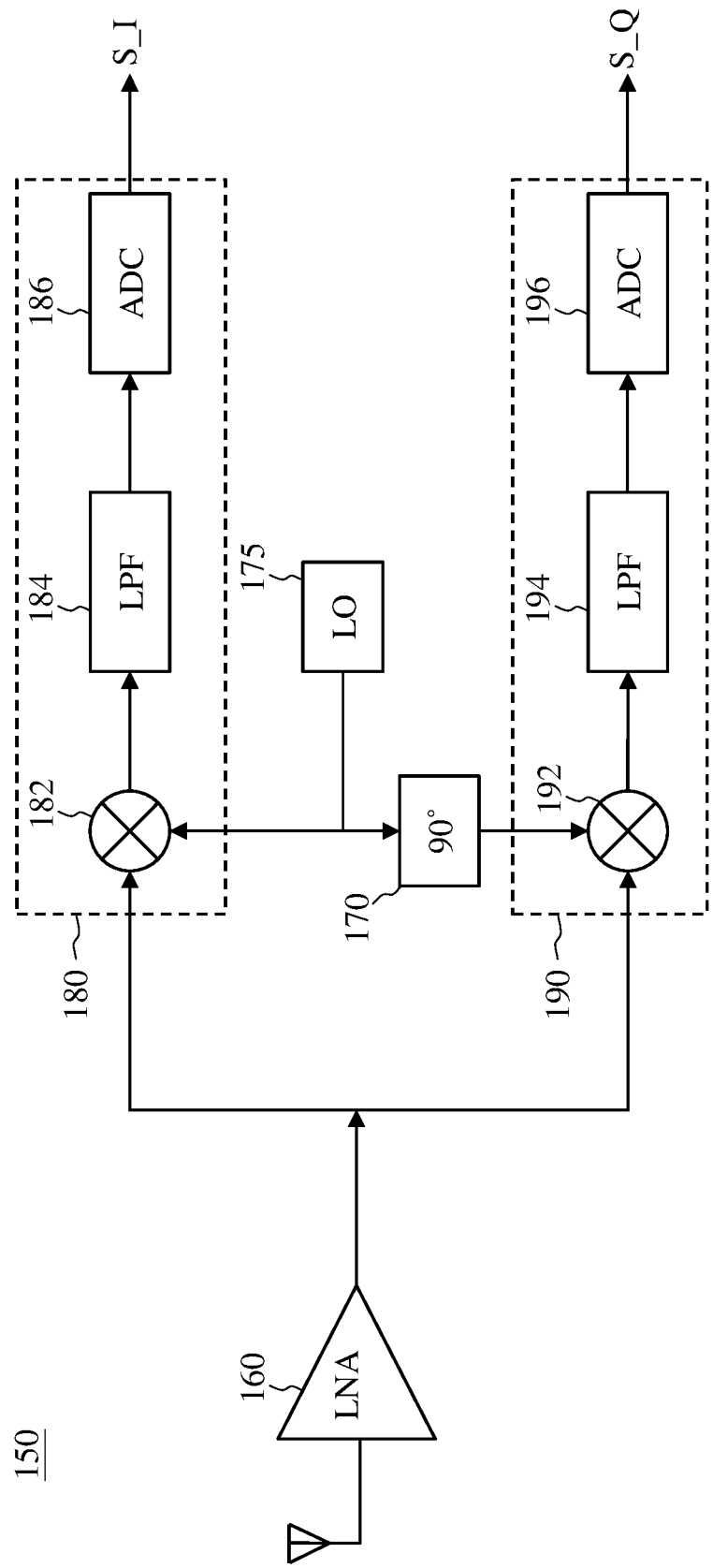
FIG. 1B illustrates a functional block diagram of a conventional direct conversion receiver.
Figure 3:
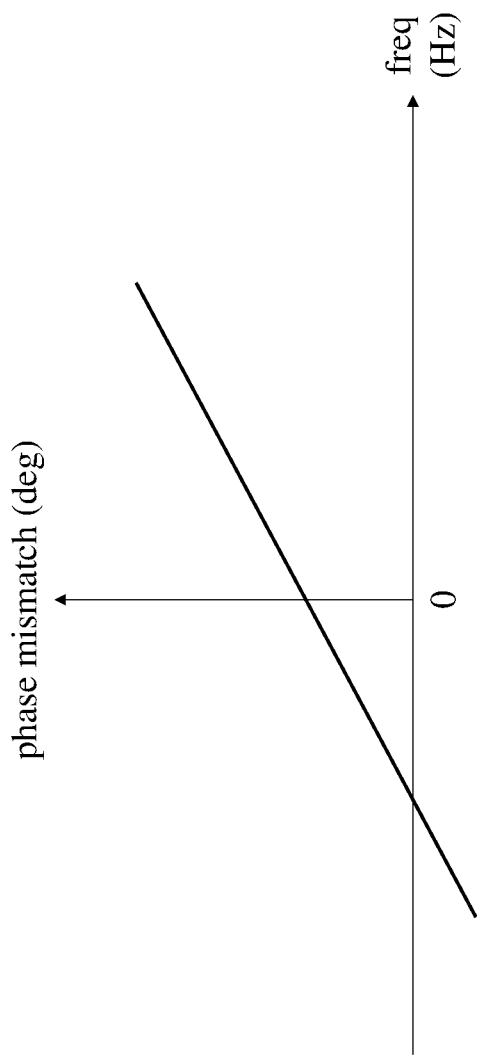

When the conditions of step S921 are not met but the conditions of step S923 are met, the relationship between phase mismatch and frequency is similar to that of FIG. 3, and the relationship between gain mismatch and frequency is similar to that of FIG. 2B. Therefore, in this situation, enabling the gain and/or phase compensation circuit 710 and the time skew compensation circuit 720 can achieve a considerable compensation effect, while the filter mismatch compensation circuit 730 is disabled to save power.

Figures 4A, 4B:
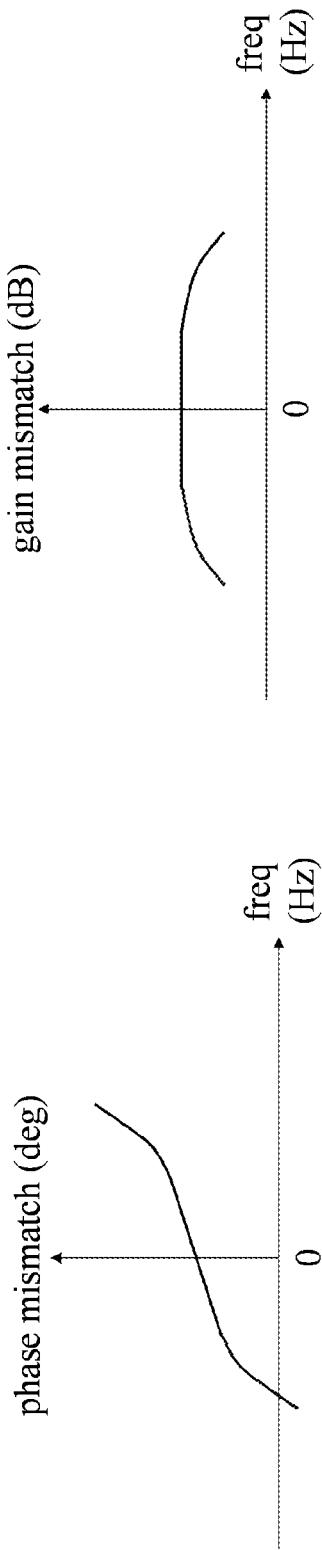

When the conditions of steps S921 and S923 are not met but the condition of step S925 is met, the relationship between phase mismatch and frequency is similar to that of FIG. 4A, and the relationship between gain mismatch and frequency is similar to that of FIG. 4B. Therefore, in this situation, enabling the gain and/or phase compensation circuit 710 and the filter mismatch compensation circuit 730 can achieve a considerable compensation effect, while the time skew compensation circuit 720 is disabled to save power.

The determination steps in FIG. 9 (i.e., steps S921, S923, and S925) do not have to be performed in sequence. Taking step S925 as an example, in some embodiments, when the second-order gain differences G_2nd_diff(i) are not greater than the threshold G_th2 and the second-order phase differences P_2nd_diff(i) are not greater than the threshold P_th2, the control circuit 525 performs step S924.

In some embodiments, when the function of the filter mismatch compensation circuit 730 includes the function of the gain and/or phase compensation circuit 710, step S926 may enable only the filter mismatch compensation circuit 730 and disable both the gain and/or phase compensation circuit 710 and the time skew compensation circuit 720.

The thresholds G_th1, P_th1, G_th2, and P_th2 can be adjusted according to experiences and practical applications. For example, the larger the thresholds G_th2 and P_th2 are, the lower the probability that the filter mismatch compensation circuit 730 is enabled (i.e., more power is saved); the smaller the thresholds G_th1 and P_th1 are, the higher the probability that the time skew compensation circuit 720 or the filter mismatch compensation circuit 730 is enabled (i.e., less power is saved).

In other embodiments, step S870 can use the regression analysis to determine a target function that can fit the relationship between the compensation parameters and the frequency. As a result, the type of mismatch (one of FIG. 2A, 2B, 3, 4A, and 4B) can be determined according to the target function. For example, if the target function is $ax^2+bx+c$, people having ordinary skill in the art can derive the conditions equivalent to those in steps S921, S923 and S925 in terms of the coefficients a, b, and c.

In some embodiments, the control circuit 525 may be a circuit or electronic component with program execution capability, such as a central processing unit (CPU), microprocessor, micro-processing unit, or their equivalents. The control circuit 525 executes the program code or program instructions stored in the memory (included in the baseband circuit 520, not shown) to perform the steps of FIGS. 8 to 9. In other embodiments, people having ordinary skill in the art can design the control circuit 525 according to the above disclosure, that is, the control circuit 525 can be an application specific integrated circuit (ASIC) or implemented by circuits or hardware such as a programmable logic device (PLD).

The present invention detects the characteristics of I/Q channel mismatch before determining the compensation mechanism, so that unnecessary circuits can be turned off to save power.

Since a person having ordinary skill in the art can appreciate the implementation detail and the modification thereto of the present method invention through the disclosure of the device invention, repeated and redundant description is thus omitted. Furthermore, the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method of controlling channel mismatch compensation, the method being used in an electronic device that comprises a signal transmission circuit or a signal receiving circuit, the signal transmission circuit or the signal receiving circuit comprising a first channel and a second channel, and the electronic device further comprising a channel mismatch compensation circuit, the method comprising:
    (A) determining a frequency of a test signal;
    (B) causing the test signal to pass through the signal transmission circuit or the signal receiving circuit, and measuring an image signal;
    (C) adjusting a compensation parameter of the channel mismatch compensation circuit to change an amplitude of the image signal;
    (D) determining, according to the amplitude of the image signal, a target compensation parameter of the channel mismatch compensation circuit, the target compensation parameter corresponding to the frequency of the test signal;
    (E) repeating steps (A) to (D) to obtain a plurality of target compensation parameters; and
    (F) determining a compensation mechanism of the channel mismatch compensation circuit based on the target compensation parameters.

2. The method of claim 1, wherein step (F) comprises:
    (F1) calculating a plurality of first-order differences and a plurality of second-order differences of the target compensation parameters; and
    (F2) determining the compensation mechanism of the channel mismatch compensation circuit according to the first-order differences and the second-order differences.

3. The method of claim 1, wherein the target compensation parameters comprise a plurality of gain compensation parameters and a plurality of phase compensation parameters, step (F) comprising:
- (F1) calculating first-order differences of the gain compensation parameters to generate a plurality of first-order gain differences;
- (F2) calculating first-order differences of the phase compensation parameters to generate a plurality of first-order phase differences; and
- (F3) determining the compensation mechanism of the channel mismatch compensation circuit according to the first-order gain differences and the first-order phase differences.

4. The method of claim 3, wherein the channel mismatch compensation circuit comprises a filter mismatch compensation circuit and/or a time skew compensation circuit, step (F3) comprising:
- disabling the filter mismatch compensation circuit and/or the time skew compensation circuit when the first-order gain differences are less than or equal to a first threshold and the first-order phase differences are less than or equal to a second threshold.

5. The method of claim 1, wherein the target compensation parameters comprise a plurality of gain compensation parameters and a plurality of phase compensation parameters, step (F) comprising:
- (F1) calculating first-order differences of the gain compensation parameters to generate a plurality of first-order gain differences;
- (F2) calculating first-order differences of the phase compensation parameters to generate a plurality of first-order phase differences;
- (F3) calculating second-order differences of the phase compensation parameters to generate a plurality of second-order phase differences; and
- (F4) determining the compensation mechanism of the channel mismatch compensation circuit according to the first-order gain differences, the first-order phase differences, and the second-order phase differences.

6. The method of claim 5, wherein the channel mismatch compensation circuit comprises a filter mismatch compensation circuit, step (F4) comprising:
- disabling the filter mismatch compensation circuit when the first-order gain differences are less than or equal to a first threshold, the first-order phase differences are greater than a second threshold, and the second-order phase differences are less than or equal to a third threshold.

7. The method of claim 1, wherein the target compensation parameters comprise a plurality of gain compensation parameters and a plurality of phase compensation parameters, step (F) comprising:
- (F1) calculating second-order differences of the gain compensation parameters to generate a plurality of second-order gain differences;
- (F2) calculating second-order differences of the phase compensation parameters to generate a plurality of second-order phase differences; and
- (F3) determining the compensation mechanism of the channel mismatch compensation circuit according to the second-order gain differences and the second-order phase differences.

8. The method of claim 7, wherein the channel mismatch compensation circuit comprises a filter mismatch compensation circuit, step (F3) comprising:
- disabling the filter mismatch compensation circuit when the second-order gain differences are not greater than a first threshold and the second-order phase differences are not greater than a second threshold.

9. A circuit for controlling channel mismatch compensation, the circuit being used in an electronic device that comprises a signal transmission circuit or a signal receiving circuit, the signal transmission circuit or the signal receiving circuit comprising a first channel and a second channel, the electronic device further comprising a channel mismatch compensation circuit, and the circuit performing following steps to determine a compensation mechanism of the channel mismatch compensation circuit:
- (A) determining a frequency of a test signal;
- (B) causing the test signal to pass through the signal transmission circuit or the signal receiving circuit, and measuring an image signal;
- (C) adjusting a compensation parameter of the channel mismatch compensation circuit to change an amplitude of the image signal;
- (D) determining, according to the amplitude of the image signal, a target compensation parameter of the channel mismatch compensation circuit, the target compensation parameter corresponding to the frequency of the test signal;
- (E) repeating steps (A) to (D) to obtain a plurality of target compensation parameters; and
- (F) determining the compensation mechanism of the channel mismatch compensation circuit based on the target compensation parameters.

10. The circuit of claim 9, wherein step (F) comprises:
- (F1) calculating a plurality of first-order differences and a plurality of second-order differences of the target compensation parameters; and
- (F2) determining the compensation mechanism of the channel mismatch compensation circuit according to the first-order differences and the second-order differences.

11. The circuit of claim 9, wherein the target compensation parameters comprise a plurality of gain compensation parameters and a plurality of phase compensation parameters, step (F) comprising:
- (F1) calculating first-order differences of the gain compensation parameters to generate a plurality of first-order gain differences;
- (F2) calculating first-order differences of the phase compensation parameters to generate a plurality of first-order phase differences; and
- (F3) determining the compensation mechanism of the channel mismatch compensation circuit according to the first-order gain differences and the first-order phase differences.

12. The circuit of claim 11, wherein the channel mismatch compensation circuit comprises a filter mismatch compensation circuit and/or a time skew compensation circuit, step (F3) comprising:
- disabling the filter mismatch compensation circuit and/or the time skew compensation circuit when the first-order gain differences are less than or equal to a first threshold and the first-order phase differences are less than or equal to a second threshold.

13. The circuit of claim 9, wherein the target compensation parameters comprise a plurality of gain compensation parameters and a plurality of phase compensation parameters, step (F) comprising:

(F1) calculating first-order differences of the gain compensation parameters to generate a plurality of first-order gain differences;

(F2) calculating first-order differences of the phase compensation parameters to generate a plurality of first-order phase differences;

(F3) calculating second-order differences of the phase compensation parameters to generate a plurality of second-order phase differences; and (F4) determining the compensation mechanism of the channel mismatch compensation circuit according to the first-order gain differences, the first-order phase differences, and the second-order phase differences.

14. The circuit of claim 13, wherein the channel mismatch compensation circuit comprises a filter mismatch compensation circuit, step (F4) comprising:

disabling the filter mismatch compensation circuit when the first-order gain differences are less than or equal to a first threshold, the first-order phase differences are greater than a second threshold, and the second-order phase differences are less than or equal to a third threshold.

15. The circuit of claim 9, wherein the target compensation parameters comprise a plurality of gain compensation parameters and a plurality of phase compensation parameters, step (F) comprising:

(F1) calculating second-order differences of the gain compensation parameters to generate a plurality of second-order gain differences;

(F2) calculating second-order differences of the phase compensation parameters to generate a plurality of second-order phase differences; and (F3) determining the compensation mechanism of the channel mismatch compensation circuit according to the second-order gain differences and the second-order phase differences.

16. The circuit of claim 15, wherein the channel mismatch compensation circuit comprises a filter mismatch compensation circuit, step (F3) comprising:

disabling the filter mismatch compensation circuit when the second-order gain differences are not greater than a first threshold and the second-order phase differences are not greater than a second threshold.

* * * * *